Dec. 13, 1938.  J. B. TEGARTY  2,140,213
METHOD AND APPARATUS FOR MAKING THERMOPLASTIC TUBING
Filed July 7, 1937  2 Sheets-Sheet 1
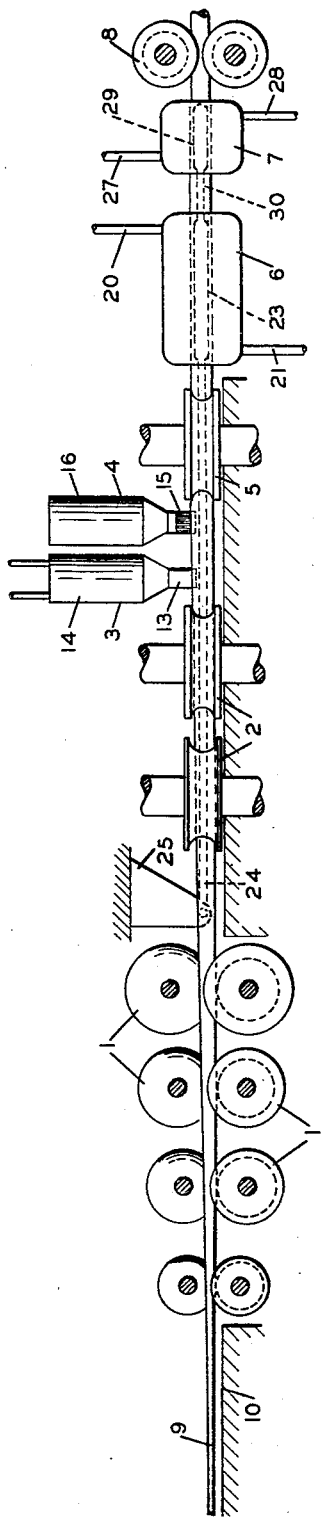
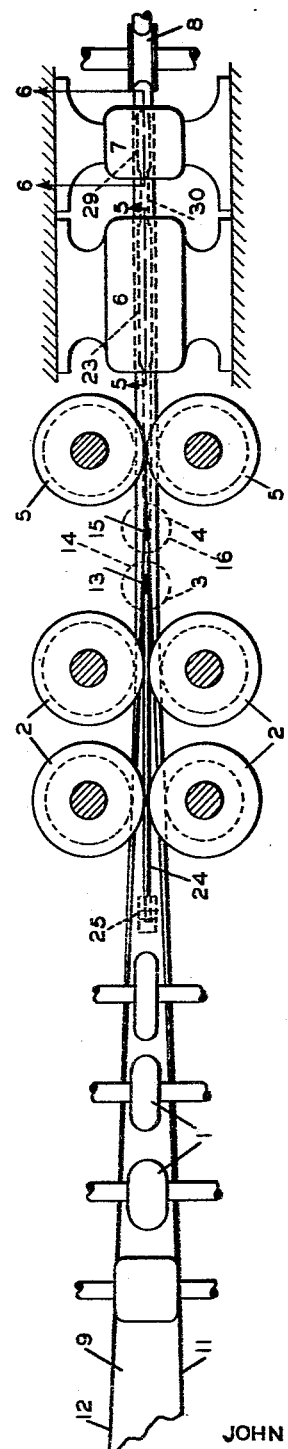
INVENTOR.
JOHN B. TEGARTY
BY
HIS ATTORNEY.

Dec. 13, 1938.  J. B. TEGARTY  2,140,213
METHOD AND APPARATUS FOR MAKING THERMOPLASTIC TUBING
Filed July 7, 1937  2 Sheets-Sheet 2

INVENTOR.
JOHN B. TEGARTY
BY
HIS ATTORNEY.

Patented Dec. 13, 1938

2,140,213

UNITED STATES PATENT OFFICE 2,140,213

METHOD AND APPARATUS FOR MAKING THERMOPLASTIC TUBING

John B. Tegarty, St. Clair, Mich., assignor to Thermo-Plastics, Inc., St. Clair, Mich., a corporation of Michigan Application July 7, 1937, Serial No. 152,320

12 Claims. (Cl. 18—10)

This invention relates to an improved method and apparatus for producing tubing from sheets or narrow strips of cellulose acetate or other thermoplastic material. In general the preferred embodiment of the invention discloses an apparatus for bending and shaping the strip stock so that the marginal edges of the strip are in substantially abutting relation, permanently securing the marginal edges together and finally drawing and reducing the tubing through a die to the desired size and shape There are many practical uses for thermoplastic tubing such as a decorative, protective, or insulating coating for pipes, hand rails and other long sections having a uniform cross section. Such sections of relatively short length have previously been covered by molding the thermoplastic coating directly to the surface in a suitable pressure mold. However, a mold for producing relatively long sections, that is in excess of three feet, is extremely bulky, expensive and impractical.

These long pipes or bars can be readily covered with an attractive finish coating by slipping a length of thermoplastic tubing, made by the present process, over the bar or pipe and then securing the said tubing to the surface of the bar or pipe by some suitable adhesive. Thus the tubing may be shipped separately to the place where it is to be assembled and the cost of shipping such tubing is far less than the cost of shipping the entire assembly by reason of the comparative lightness in weight of the thermoplastic tubing to the metal bar or pipe stock which is to be covered.

Prior attempts to form thermoplastic tubing from flat strip stock have failed principally because the seam where the lateral edges of the strip abut each other is not sufficiently strong. Such tubing appears to be firmly welded at the seam immediately after it is formed but upon being subjected to temperature changes with the resulting contraction and expansion these seams oftentimes split open.

Still other attempts to extrude thermoplastic tubing directly from pressure cylinders have failed because of the inability to maintain a sufficient pressure on the material in the forming die while the material is solidifying. As a result this material is porous, rough and impractical for use.

The principal object of the present invention is to provide an improved method and apparatus for forming tubing directly from flat strips of thermoplastic material while maintaining the material in a smooth homogeneous mass.

A correlative object is to make such thermoplastic tubing as strong at the seam portion as the remainder of the tubing and which will survive normal temperature changes and other stresses without splitting at the seam.

A more specific object is to provide a device for straightening and conditioning the mating edges of the strips preparatory to joining the said edges together.

Another specific object is to provide a method for permanently joining the edges of the strip together to produce the tubing, which consists in applying a film of thermoplastic solvent to the previously prepared edges of the strips and immediately thereafter compressing these edges tightly together to cause the dissolved material at the edges to merge and fuse into an integral mass.

Another object is to draw or reduce the tubing by urging it through suitable dies to produce the desired accurate size and shape on the inner and outer surfaces and also to provide the proper temperature control of these dies to facilitate the drawing operation.

Other objects and advantages will become apparent from the following specification and accompanying drawings, in which:

Fig. 1 is a schematic side view indicating the various stages of operation in the production of tubing from flat sheet stock;

Fig. 2 is a plan view of the same stages of operation shown in Fig. 1;

Figure 3:
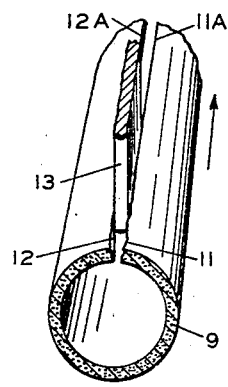
Fig. 3 is a perspective view of a section of tubing showing one means for conditioning the mating edges of the strip stock.

Referring to the drawings, and more specifically to Figs. 1 and 2, the apparatus comprises in general a plurality of stages, each of which performs a definite function or operation in the formation of the tubing. These stages in their order include power driven forming rolls 1, secondary rolls 2 disposed substantially at right angles to the forming rolls, an ironing or edge-straightening device 3 for conditioning the edges of the strip, a solvent applying device 4 for applying the solvent or adhesive to the conditioned edges, power driven pressure rolls 5 for compressing the edges of the strips tightly together after the solvent has been applied, a drawing die 6, a reducing die 7, and drawing rolls 8. Each of the above stages will be hereinafter more fully described in detail.

The material used in the manufacture of this tubing is preferably in the form of long narrow strips 9 of relatively thin sheet cellulose acetate or other thermoplastic material, the sheets having a width corresponding substantially to the desired circumference of the finished tubing. These strips 9 first pass in close proximity with a suitable heating table 10 which softens the material and renders it pliable. Each strip 9 is singularly guided and moved longitudinally between the pairs of power driven primary forming rolls 1 at a substantially uniform rate. These rolls, which may be similar to the rolls used in the production of metal tubing, progressively curl or bend the strip so that lateral edges 11 and 12 thereof lie substantially in abutting relation.

This partially formed strip 9 then proceeds from the primary rolls to the secondary forming rolls 2, the axes of which are preferably disposed at right angles to the axes of the primary rolls 1. These secondary rolls engage only the outer or convex surface of the partially bent strip and gradually force the marginal edges 11 and 12 in closer relationship with each other. Before these edges are brought into abutting engagement, however, they are rendered straight, smooth and parallel by the edge conditioning device 3 about to be described.

This edge conditioning device comprises a flat narrow tool 13 which is disposed between the marginal edges 11 and 12, as shown in Fig. 3. The tool is provided with flat surfaces, one of which engages the edge 11, and the other engages the edge 12. As the strip 9 moves longitudinally relative to the tool 13, these flat surfaces contact the edges 11 and 12 which are relatively rough and irregular and renders the edges straight, smooth and substantially parallel, as indicated at 11A and 12A. It will be noted that the surfaces of the tool 13, which produce these smooth straight edges 11A and 12A, are such that when the edges are brought into engagement with each other, they are absolutely straight, parallel and contiguous. These edges may be flat or provided with interfitting surfaces as desired.

Figure 4:
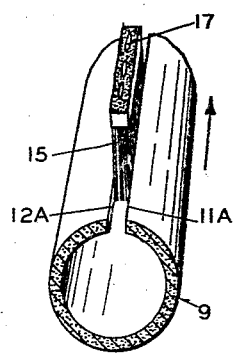
Fig. 4 is a fragmentary perspective view similar to Fig. 3 showing a means for applying a film of solvent to the conditioned edges of the strip.

The surfaces of the tool 13 are preferably maintained at a relatively high temperature so that as the strip 9 moves relative to the tool, the rough, irregular marginal edges 11 and 12 partially melt and become plastic as the said edges contact the surfaces. Thus the rough edges 11 and 12 are ironed out to produce the smooth and straight edges 11A and 12A, as shown in Figs. 3 and 4.

To maintain the ironing tool 13 at this high temperature, a heating means 14, such as a steam coil or electrical heating coil, shown in Fig. 1, is provided. This heating means is such a capacity as to maintain the surfaces of the ironing tool 13 at a temperature sufficient to condition the edges 11 and 12 continuously preparatory to joining them together.

The adhesive applying device 4 is preferably positioned closely adjacent the ironing device 3 and disposed therefrom in the direction of movement of the strip 9. This device 4 applies a continuous film of thermoplastic solvent, such as acetone, to the smooth, straight, parallel edges 11A and 12A. An exemplary means by which this film of acetone may be applied is through the medium of a brush 15, the bristles of which lie between and contact the edges 11A and 12A, as shown in Fig. 4. The acetone is preferably supplied by gravity to the brush 15 from a container 16 through small conductor tubes 17 disposed within the bristles. Thus as the strip 9 moves longitudinally through the apparatus the brush 15 deposits a film of acetone or solvent on prepared edges 11A and 12A. This solvent dissolves the surface portion of the edges, rendering them plastic and gummy.

Figure 5:
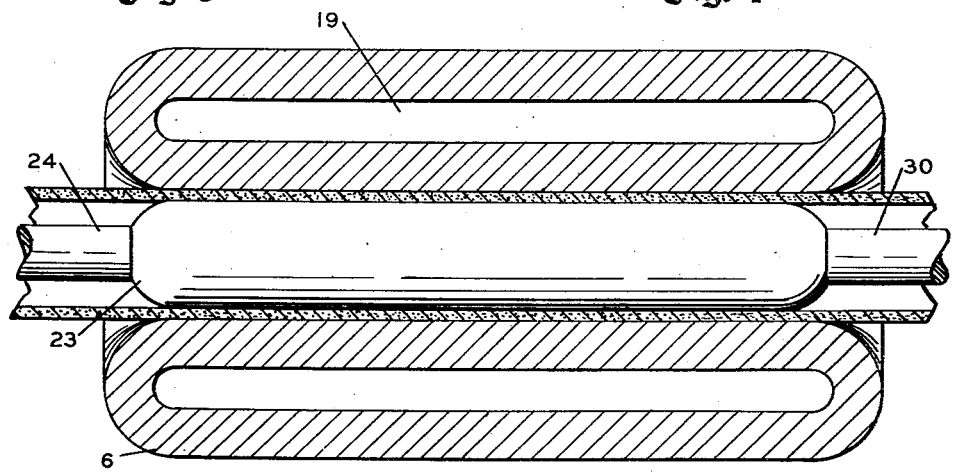
Fig. 5 is an enlarged sectional view through one of the dies and is taken on a plane indicated by the line 5—5 in Fig. 2.
Figure 6:
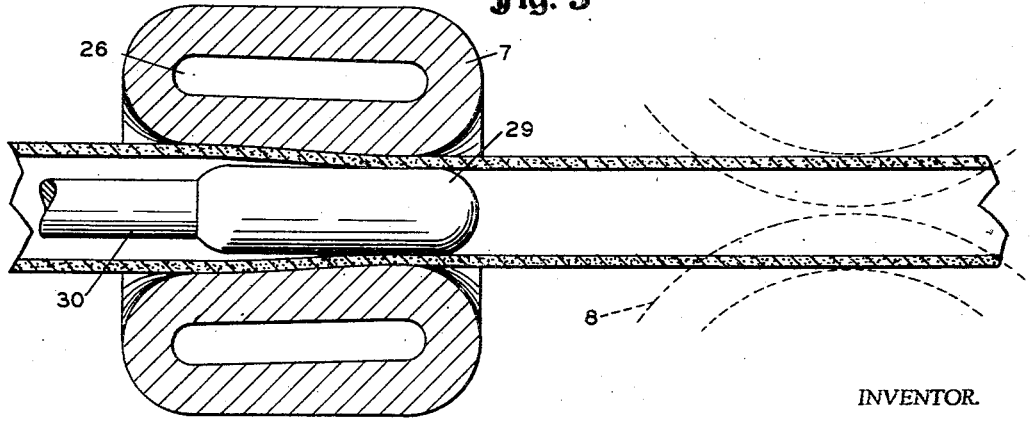
Fig. 6 is an enlarged sectional view of the reducing or drawing die and is taken substantially along the line 6—6 of Fig. 2.

Immediately after this acetone or solvent has been applied to the edges 11A and 12A, the strip 9 passes between the peripheries of the pressure rolls 5 which are preferably power driven and which revolve in a plane substantially normal to the planes defined by the surfaces of the marginal edges 11A and 12A. These rolls urge the plastic and gummy edges into contact with each other under relatively high pressure. When the tubing is thus closed, the plastic edges 11A and 12A fuse and weld together into an integral mass. The excess solvent and dissolved thermoplastic material, which is inherently squeezed from between the edges 11A and 12A, is removed from the inner and outer surface of the tube by passing the tube through the die 6 as indicated in Fig. 5. The drawing surface of the die is maintained at a relatively high temperature for the purpose of driving off the volatile solvent from the thermoplastic material. Furthermore, the welded edges 11A and 12A are additionally compressed during the passage of the tube through the die to more permanently fuse the edges together.

The temperature of the drawing surface of the die 6 may be maintained and controlled by passing live steam through a passage 19 surrounding the surface, the steam being conducted thereto and therefrom by pipes 20 and 21, respectively. This die may be heated by an electrical coil positioned around the drawing surface.

In addition to the drawing surface of the die 6 which shapes and finishes the outer surface of the tubing, there is a mandrel 23 disposed within the tubing for concurrently forming the inner surface of the tube, as shown in Fig. 5. This mandrel is preferably substantially cylindrical in shape with rounded end portions. It is held in a stationary position with respect to the die 6 by a long link 24 which extends from the mandrel in a direction opposite to the direction of travel of the strip 9 and which is secured to a suitable rigid anchor plate 25. This anchor plate is preferably positioned between the primary rolls 1 and secondary rolls 2, as shown in Fig. 1. Thus, as the tubing travels longitudinally through the die 6, the drawing surface thereof shapes the outside and the mandrel forms the inside surface of the tubing rendering the entire surface smooth and free from flaws.

From the die 6, the tubing may enter the drawing or reducing die 7 which finishes the tubing to the desired size and shape. The drawing surface of the die 7 is slightly convergent in the direction of travel of the tubing so that the finished diameter thereof is reduced and the length of the finished section is accordingly materially greater than the original length of the flat strip 9.

This reducing operation through the die 7 is facilitated and made possible by maintaining the temperature of the drawing surface to the proper degree, which is preferably relatively high. This may be accomplished by conducting live steam to a chamber 26 within the die 7, the steam being conducted to and from the chamber by suitable pipes 27 and 28, respectively. Suitable valves, which form no part of this invention, may be employed to control and regulate the passage of thermal fluid through the chambers.

During the reducing operation, the interior wall of the tubing is maintained cylindrical or any other shape by a mandrel 29 which is anchored against movement relative to the die 7 by a link 30, the said link being secured to the adjacent end of the mandrel 23 as indicated by dotted lines in Figs. 1 and 2.

The power driven rolls 8 engage and draw the tubing from the reducing die 7 at a rate proportional to the amount of reduction of the tubing. This rate may be accurately controlled by suitable gearing (not shown).

From the above description, it will be seen that a novel, effective and inexpensive method and apparatus for the production of tubing sections from long narrow strips or sheets of thermoplastic material has been disclosed. The principal features of the apparatus are the device for conditioning the edges of the strip so that they are straight and parallel, the device for applying the film of solvent or adhesive to these prepared edges and the means for compressing the edges together to assure a firm bond at the joint which is as strong as any other portion of the strip of material.

Having thus described my invention, I claim:

1. The method of making a length of tubing from a narrow flat strip of thermoplastic material comprising bending the strip between the marginal edges to form a substantially cylindrical section, the marginal edges being disposed in substantially abutting relation, ironing the marginal edges concurrently to produce straight parallel abutting surfaces, applying a film of solvent to said parallel surfaces, and then compressing the surfaces tightly together to close the tubing.

2. The method of making a length of tubing from a narrow flat strip of thermoplastic material comprising bending the strip between the marginal edges to form a substantially cylindrical section, the marginal edges being disposed in substantially abutting relation, ironing the marginal edges concurrently to produce straight parallel abutting surfaces, applying a film of solvent to said parallel surfaces, then compressing the surfaces tightly together to close the tubing, and finally passing the said tubing through a heated die to produce the desired shape.

3. The continuous method of making tubing from a narrow flat strip of thermoplastic material comprising moving the strip continuously endwise, bending the strip between the lateral edges into substantially cylindrical form with the marginal edges disposed in substantially abutting relation and defining a seam cleft, dressing the marginal edges concurrently with said movement to produce mating abutting edge surfaces, and during continuance of said movement applying a film of solvent to said edge surfaces, and compressing the surfaces tightly together to close the cleft.

4. The continuous method of making tubing from a narrow flat strip of thermoplastic material comprising moving the strip continuously endwise, bending the strip between the lateral edges into substantially cylindrical form with the marginal edges disposed in substantially abutting relation and defining a seam cleft, dressing the marginal edges concurrently with said movement to produce mating abutting edge surfaces and, during continuance of said movement, applying a film of solvent to said edge surfaces, compressing the surfaces tightly together to close the cleft, and then, during continuance of said movement, heating the tubing and shaping the same to the desired shape.

5. The continuous method of making tubing from a narrow flat strip of thermoplastic material comprising moving the strip continuously endwise, bending the strip between the lateral edges into substantially cylindrical form with the marginal edges disposed in substantially abutting relation and defining a seam cleft, dressing the marginal edges concurrently with said movement to produce mating abutting edge surfaces and, during continuance of said movement, applying a film of solvent to said edge surfaces, compressing the surfaces tightly together to close the cleft, and then, during continuance of said movement, heating the tubing and drawing it to a reduced diameter.

6. The continuous method of making tubing from a narrow flat strip of thermoplastic material comprising moving the strip continuously endwise, bending the strip between the lateral edges into substantially cylindrical form with the marginal edges disposed in substantially abutting relation and defining a seam cleft, dressing the marginal edges concurrently with said movement to produce mating abutting edge surfaces and, during continuance of said movement, applying a film of solvent to said edge surfaces, compressing the surfaces tightly together to close the cleft, and then, during continuance of said movement, heating the tubing and shaping the same to the desired shape while supporting it internally at the portion being shaped.

7. The method of making tubing from a narrow flat strip of thermoplastic material comprising subjecting the strip to a temperature sufficient to render it easily pliable, bending the strip so that the lateral edge surfaces thereof lie in substantially abutting relation to produce a hollow tubular section, heating and concurrently ironing the edge surfaces of the strip to preconfigure the same for mating relation with each other, brushing a film of solvent onto the said mating surfaces, and tightly squeezing the said surfaces together to cause intimate union of the dissolved surface material.

8. The method of making tubing from a narrow flat strip of thermoplastic material comprising subjecting the strip to a temperature sufficient to render it easily pliable, bending the strip so that the lateral edge surfaces thereof lie in substantially abutting relation to produce a hollow tubular section, heating and concurrently ironing the edge surfaces of the strip to preconfigure the same for mating relation with each other, brushing a film of solvent onto the said mating surfaces, tightly squeezing the said surfaces together to cause intimate union of the dissolved surface material, and passing the tubing through a heated die to further press the edges together and to drive off the volatile portion of the solvent.

9. The method of making tubing from a narrow flat strip of thermoplastic material comprising subjecting the strip to a temperature sufficient to render it easily pliable, bending the strip so that the lateral edge surfaces thereof lie in substantially abutting relation to produce a hollow tubular section, heating and concurrently ironing the edge surfaces of the strip to preconfigure the same for mating relation with each other, brushing a film of solvent onto the said mating surfaces, tightly squeezing the said surfaces together to cause intimate union of the dissolved surface material, passing the tubing through a heated die to further press the edges together and to drive off the volatile portion of the solvent, and finally drawing the tubing through a heated reducing die to form the tubing to the desired size and shape.

10. The continuous method of making tubing from a narrow flat strip of thermoplastic material comprising continuously moving the strip endwise, subjecting the strip to a temperature sufficient to render it easily pliable and bending it into tubular form with the lateral edge surfaces thereof in substantially abutting relation along one portion of the path of movement, shaping the lateral edge surfaces of the strip along a succeeding portion of said path, applying solvent to the said shaped lateral surfaces, tightly squeezing the said surfaces together to cause intimate union of the dissolved surface material along a succeeding portion of the path, heating the tubular material to drive off the volatile portion of the solvent, and finally heating the tubular material and forming it to the desired size and shape along the final portion of said path of movement.

11. An apparatus for forming tubing from a long narrow strip of sheet thermoplastic material comprising a heating table in close proximity with the sheet thermoplastic material, power driven forming rolls which move the material longitudinally of the apparatus and bend the strip so that the lateral edges thereof lie in substantially abutting relation, means engaging both lateral edges for producing mating surfaces thereon, further means for applying a thermoplastic solvent to the said mating surfaces, rolls for completely closing and compressing the said mating surfaces tightly together, and die means for smoothing the inner and outer surfaces of the tubing.

12. An apparatus for forming tubing from a long narrow strip of sheet thermoplastic material comprising a heating table for rendering the strip pliable, a plurality of power driven forming rolls moving the strip through the apparatus at a substantially uniform rate endwise and for bending the said strip between the lateral edges to produce a hollow tube with an open cleft between the lateral edges, pressure rolls for closing the cleft between the lateral edges, a heated ironing tool engaging both of said lateral edges for producing smooth mating surfaces along said edges, a device for applying a film of solvent to said smooth mating surfaces, said heated ironing tool and said device being disposed between said forming rolls and said pressure rolls, and shaping and drawing means for finishing the inner and outer surfaces of the tubing concurrently.

JOHN B. TEGARTY.